US008705123B2

(12) United States Patent
Nakajima

(10) Patent No.: US 8,705,123 B2
(45) Date of Patent: Apr. 22, 2014

(54) IMAGE FORMING APPARATUS, IMAGE FORMING METHOD, AND PROGRAM

(75) Inventor: Takehiro Nakajima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 159 days.

(21) Appl. No.: 13/137,767

(22) Filed: Sep. 12, 2011

(65) Prior Publication Data

US 2012/0069358 A1 Mar. 22, 2012

(30) Foreign Application Priority Data

Sep. 16, 2010 (JP) ................................ 2010-207786
Aug. 30, 2011 (JP) ................................ 2011-187940

(51) Int. Cl.
*G06K 15/02* (2006.01)
*H04N 1/60* (2006.01)

(52) U.S. Cl.
USPC ............ 358/1.9; 358/2.1; 358/518; 358/521; 358/523; 358/3.01; 347/14; 347/105; 347/15; 347/17

(58) Field of Classification Search
USPC .................................. 358/2.1, 518, 521, 523
See application file for complete search history.

(56) References Cited

U.S. PATENT DOCUMENTS 5,091,743 A * 2/1992 Nagata et al. ................ 355/401
5,311,268 A * 5/1994 Ohzeki et al. .................. 399/42
7,403,305 B2 7/2008 Nakajima
2004/0114165 A1 6/2004 Nakajima
2009/0016759 A1 * 1/2009 Ashikawa et al. ............. 399/67

FOREIGN PATENT DOCUMENTS

JP 3679253 B2 8/2005
JP 2006-256299 A 9/2006
JP 2009-014997 A 1/2009

OTHER PUBLICATIONS

English language abstract for patent publication No. JP-2000-138816 which corresponds to JP-3679253-B2.

* cited by examiner

*Primary Examiner* — Quang N Vo
(74) *Attorney, Agent, or Firm* — Harness, Dickey & Pierce, P.L.C.

(57) ABSTRACT

An image forming apparatus including an attribute-value-information holding unit that holds an attribute-value table showing correspondence between a type of gradation processing and a fixing-temperature control attribute value; an image-formation-attribute processing unit that determines a type of gradation processing and a corresponding fixing-temperature control attribute value on the basis of contents of a print instruction and the attribute-value table; a gradation processing unit that performs gradation processing in accordance with the type of gradation processing determined by the image-formation-attribute processing unit; and a fixing-temperature control unit that controls fixing temperature in formation of a print image according to the fixing-temperature control attribute value determined by the image-formation-attribute processing unit.

9 Claims, 5 Drawing Sheets

IMAGE FORMING APPARATUS, IMAGE FORMING METHOD, AND PROGRAM

CROSS-REFERENCE TO RELATED APPLICATIONS

The present application claims priority to and incorporates by reference the entire contents of Japanese Patent Application No. 2010-207786 filed in Japan on Sep. 16, 2010 and Japanese Patent Application No. 2011-187940 filed in Japan on Aug. 30, 2011.

BACKGROUND OF THE INVENTION

1. Field of the Invention

The present invention relates to an electrophotographic image forming apparatus and image forming method, and a program.

2. Description of the Related Art

In recent years, energy conservation in a main body of an electrophotographic copier/printer has been requested, and with this, reduction in power consumption of individual components of a printer engine as an image forming unit has been required. Especially, a fixing unit, which fuses toner transferred onto a print sheet by application of heat thereby fixing the toner on the print sheet, requires a large amount of electric power in a short period of time, so if power consumption of the fixing unit can be reduced, it brings a great effect on energy conservation.

Conventionally, there is known a technology to control fixing temperature according to printing conditions, such as a type of sheet, the thickness of the sheet, and the sheet conveying speed associated with these. However, it is difficult to stabilize the preset temperature of a fixing unit to a target temperature for a certain period of time due to a usage environment and a temporal change of a component, etc.; therefore, in most cases, the preset temperature is set to a rather high temperature to prevent a trouble, such as cold offset, at the time of fixing. Furthermore, in some cases, fixing is performed at the uniform preset temperature regardless of a type of input image (a photo image, a text image, etc.), a type of gradation processing (halftone dot, line screen, dispersed dot, etc.), and the like. Therefore, for example, for a text image in which an area of a gradation processing pattern used in printing and a drawing area are relatively small, the preset temperature is too high, and electric power is consumed more than necessary.

Incidentally, for example, in a technology disclosed in Japanese Patent Application Laid-open No. 2009-14997, in view of the fact that the preset temperature of a fixing unit changes according to a usage environment and due to a temporal change of a component, etc., and this brings a change in image quality of a print image, temperature information of the fixing unit is acquired, and a density-gradation correction parameter is determined on the basis of the temperature information, thereby suppressing a change in image quality of a print image; however, reduction in power consumption is not resolved.

SUMMARY OF THE INVENTION

It is an object of the present invention to at least partially solve the problems in the conventional technology.

According to an aspect of the present invention, there is provided an image forming apparatus including an attribute-value-information holding unit that holds an attribute-value table showing correspondence between a type of gradation processing and a fixing-temperature control attribute value; an image-formation-attribute processing unit that determines a type of gradation processing and a corresponding fixing-temperature control attribute value on the basis of contents of a print instruction and the attribute-value table; a gradation processing unit that performs gradation processing in accordance with the type of gradation processing determined by the image-formation-attribute processing unit; and a fixing-temperature control unit that controls fixing temperature in formation of a print image according to the fixing-temperature control attribute value determined by the image-formation-attribute processing unit.

According to another aspect of the present invention, there is provided an image forming method of an image forming apparatus including an attribute-value-information holding unit that holds an attribute-value table showing correspondence between a type of gradation processing and a fixing-temperature control attribute value, the image forming method including determining a type of gradation processing and a corresponding fixing-temperature control attribute value on the basis of contents of a print instruction and the attribute-value table; performing gradation processing in accordance with the type of gradation processing determined at the determining; and controlling fixing temperature in formation of a print image according to the fixing-temperature control attribute value determined at the determining.

According to still another aspect of the present invention, there is provided a computer program product comprising a computer readable medium having computer readable program instructions that, when executed in a computer including an attribute-value-information holding unit that holds an attribute-value table showing correspondence between a type of gradation processing and a fixing-temperature control attribute value, cause the computer to execute determining a type of gradation processing and a corresponding fixing-temperature control attribute value on the basis of contents of a print instruction and the attribute-value table; performing gradation processing in accordance with the type of gradation processing determined at the determining; and controlling fixing temperature in formation of a print image according to the fixing-temperature control attribute value determined at the determining.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of an image forming apparatus, an image forming method, and a program according to the present invention is explained in detail below with reference to the accompanying drawings.

Embodiment

Figure 1:
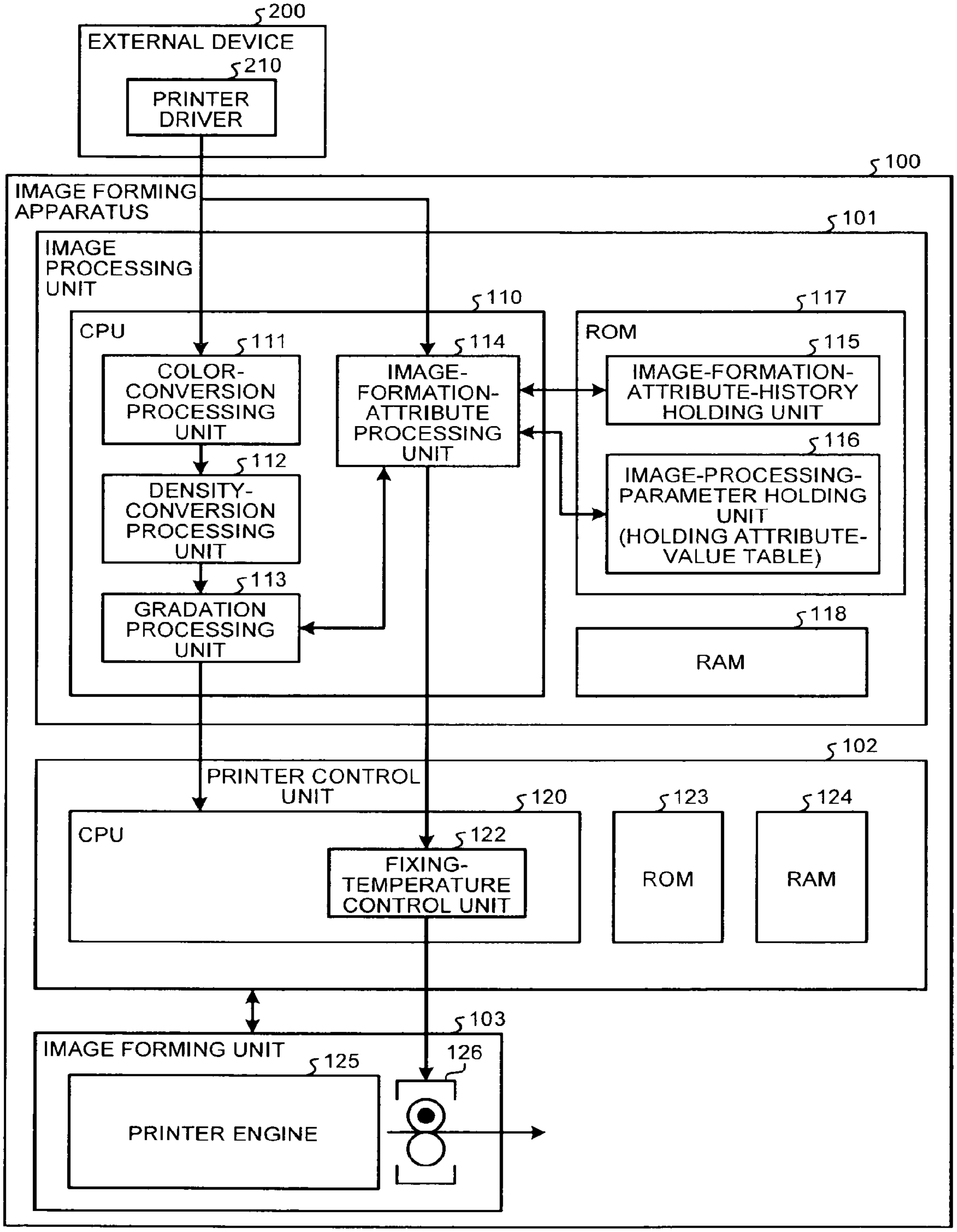
FIG. 1 is a block diagram showing a configuration of an image forming apparatus according to an embodiment.

FIG. 1 is a block diagram showing a configuration of an image forming apparatus according to an embodiment. In FIG. 1, an image forming apparatus 100 is divided broadly into an image processing unit 101, a printer control unit 102, and an image forming unit 103. Although the image forming apparatus 100 further includes an image reading unit (a scanner), the image reading unit is omitted from FIG. 1.

The image processing unit 101 is realized by a microcomputer system having a central processing unit (CPU) 110, a read-only memory (ROM) 117, and a random access memory (RAM) 118. The image processing unit 101 includes a color-conversion processing unit 111, a density-conversion processing unit 112, a gradation processing unit 113, an image-formation-attribute processing unit 114, an image-formation-attribute-history holding unit 115, and an image-processing-parameter holding unit 116, which will be described later, and the like.

The printer control unit 102 is composed of a microcomputer system having a CPU 120, a ROM 123, and a RAM 124, and controls the entire apparatus. Furthermore, the printer control unit 102 has at least a fixing-temperature control unit 122. Although a detailed configuration of the image forming unit 103 is not shown in FIG. 1, the image forming unit 103 mainly includes a printer engine 125 having a charging unit, an exposure unit, a developing unit, and a transfer unit, etc., a fixing unit 126, a sheet feed unit, and the like. The fixing unit 126 mainly includes, for example, a fixing roller having a built-in heater and a pressure roller which is facing the fixing roller and applies pressure on the fixing roller; the fixing unit 126 is configured to detect the surface temperature of the fixing roller by the use of a thermistor or the like and feed the detected fixing temperature back to the fixing-temperature control unit 122.

Besides control to be described later, the fixing-temperature control unit 122 performs turn-on control of the heater in accordance with the detected fixing temperature as it is usually done. Incidentally, a pair of the fixing roller and the pressure roller is shown in FIG. 1; alternatively, a well-known fixing-belt type of heat fixing mechanism can be employed. Furthermore, the printer engine 125 can be a black-and-white image forming unit or a full-color image forming unit as long as the image forming unit performs image formation on the basis of an electrophotographic process.

An external device 200 is connected to the image forming apparatus 100. The external device 200 is a personal computer (PC) or the like, and includes a printer driver 210. In FIG. 1, only one external device 200 is shown; however, a plurality of external devices can be connected to the image forming apparatus 100.

The external device 200 transmits print data to the image forming apparatus 100 through the printer driver 210. This print data contains printing conditions and information required for printing. The operation of the image forming apparatus 100 is explained below.

Print data transmitted from the external device 200 is retrieved by the image processing unit 101 of the image forming apparatus 100. The image-formation-attribute processing unit 114 in the image processing unit 101 analyzes the print data (performs an image-formation-attribute analysis), and determines a type of gradation processing and a fixing-temperature control attribute value with reference to the image-formation-attribute-history holding unit 115, the image-processing-parameter holding unit 116 holding parameters including an attribute-value table to be described later, and the like, and then transmits information on the type of gradation processing to the gradation processing unit 113 and transmits information on the fixing-temperature control attribute value to the fixing-temperature control unit 122 in the printer control unit 102. The operation of the image-formation-attribute processing unit 114 will be described later.

Meanwhile, in the image processing unit 101, the color-conversion processing unit 111 converts the print data transmitted from the external device 200 into a printable color that the printer engine 125 of the image forming unit 103 can reproduce. Then, the density-conversion processing unit 112 performs a desired density conversion process (gamma correction process) on the print data subjected to the color conversion, using a look-up table (LUT) or the like. Contents of the LUT can be changed by causing the image reading unit (not shown) to read out a color chart for density correction. Then, the gradation processing unit 113 performs gradation processing (binarization) on the print data subjected to the density conversion in accordance with the type of gradation processing received from the image-formation-attribute processing unit 114, and transmits the binarized data to the printer control unit 102. Furthermore, the printer control unit 102 transmits the binarized data to the image forming unit 103.

In the image forming unit 103, the printer engine 125 performs formation of a dot-pattern latent image on a photoreceptor, transfer of toner to a sheet, fixing of the toner on the sheet by fusing the toner, and the like in accordance with the binarized data processed by the gradation processing unit 113, and discharges the sheet. At the time of fixing the toner on the sheet, the fixing-temperature control unit 122 controls the fixing temperature of the fixing roller in the fixing unit 126 on the basis of the fixing-temperature control attribute value which is one of image-formation control information transmitted from the image-formation-attribute processing unit 114.

Figure 2:
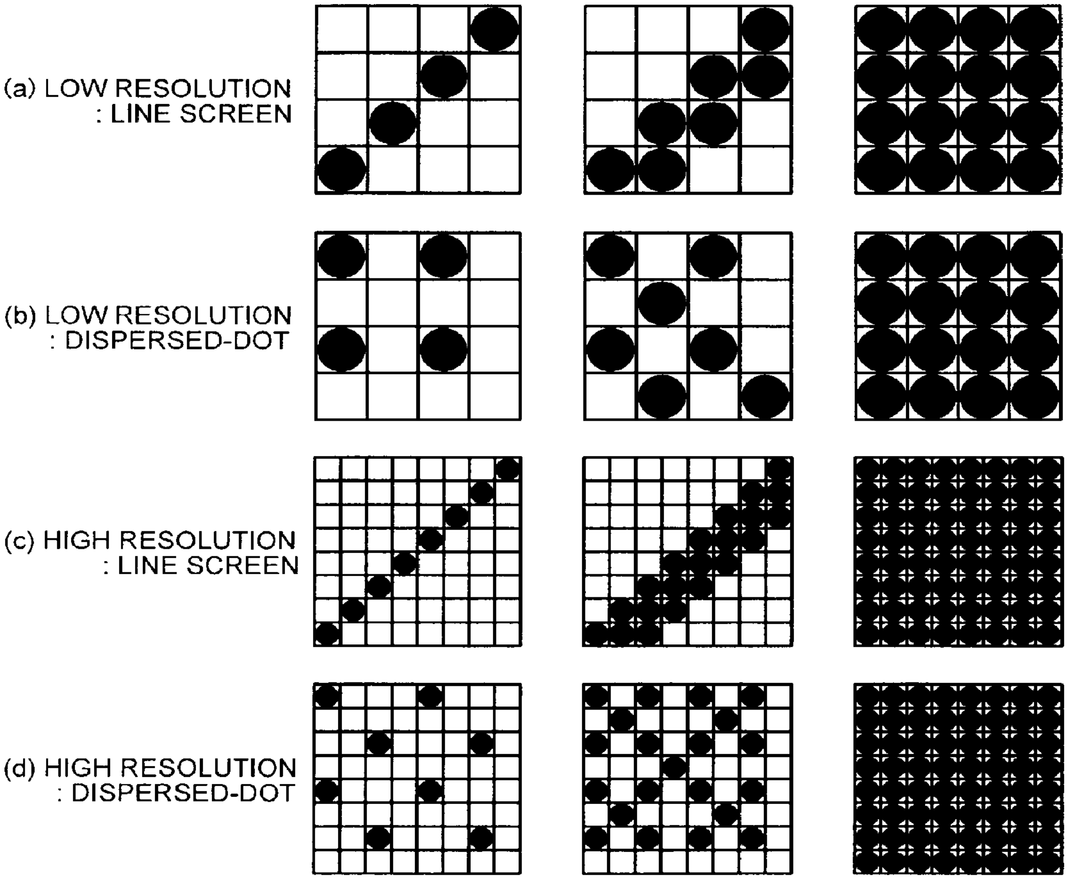
FIG. 2 is a diagram showing an example of types of gradation processing.

FIG. 2 is a diagram showing an example of types of gradation processing. As methods to print dots on a sheet, there are a line screen pattern in which dots are grown as if to draw a line (for example, (a) and (c)) and a dispersed-dot pattern in which dots are dispersed and printed (for example, (b) and (d)). Besides these, there is a halftone-dot pattern in which dots are grown as if to gather dots together; however, this is equivalent to the line screen pattern on the point that dots are grown by making dots adjoined. Furthermore, by changing the size of dots to be written in addition to the dot printing method, it is possible to distinguish between low resolution and high resolution (expressed in dots per inch (dpi)) (for example, between (a), (b) and (c), (d)). Furthermore, even at the same resolution, by changing a dot writing interval, it is possible to distinguish the resolving power (between a small number of lines per inch (lpi) and a large number of lpi).

As described above, in the image forming unit 103, processes for formation of a dot-pattern latent image on a photoreceptor, transfer of toner to a sheet, and fixing of the toner on the sheet by fusing the toner are performed, and a print image is formed on the sheet; whether adherence of the toner to the sheet is good or bad depends on a type of gradation processing (line screen or dispersed-dot), the resolution, and the resolving power which are selected by the image processing unit 101. There are tendencies that adherence of the toner is good when dots are arranged to be adjoined, adherence of the toner is good when the size of dots is big, and adherence of the toner is good when the resolving power is low.

In the fixing unit 126, when the temperature in fusing the toner is generally high, adherence of the toner to the sheet is good; however, the preset temperature of the fixing unit 126 is conventionally set to be relatively high regardless of a type of gradation processing to perform the toner fusion stably because it is also necessary to ensure the fixing ability with respect to such a type of image as a thin line image to a solid image. Therefore, depending on a type of gradation processing to be used, the temperature of the fixing unit 126 may be higher than necessary, and as a result, the heater of the fixing unit 126 consumes a larger amount of electric power than necessary.

For example, in the types of gradation processing shown in FIG. 2, the fixing temperature required by the fixing unit 126 is highest in (d), second-highest in (c), third-highest in (b), and lowest in (a). Therefore, when the preset temperature of the fixing unit 126 is set to the highest temperature required in the case of (d), for example, if a type of gradation processing in (c) is decided as a type of gradation processing to be used, a larger amount of electric power than necessary is consumed. In response to this, in the present embodiment, the fixing temperature is determined by a type of gradation processing to be used, so it is possible to prevent consumption of a larger amount of power than necessary.

In FIG. 1, with respect to the print data and printing conditions transmitted from the printer driver 210 of the external device 200, the image-formation-attribute processing unit 114 in the image processing unit 101 determines a type of gradation processing to be used in printing, for example, from a character printing mode, and determines a superordinate category of a fixing-temperature control attribute value, and further determines a subordinate category of the fixing-temperature control attribute value according to an image area in drawing. Then, the image-formation-attribute processing unit 114 transmits the determined type of gradation processing to the gradation processing unit 113 and transmits the determined fixing-temperature control attribute value to the fixing-temperature control unit 122.

Figure 3:
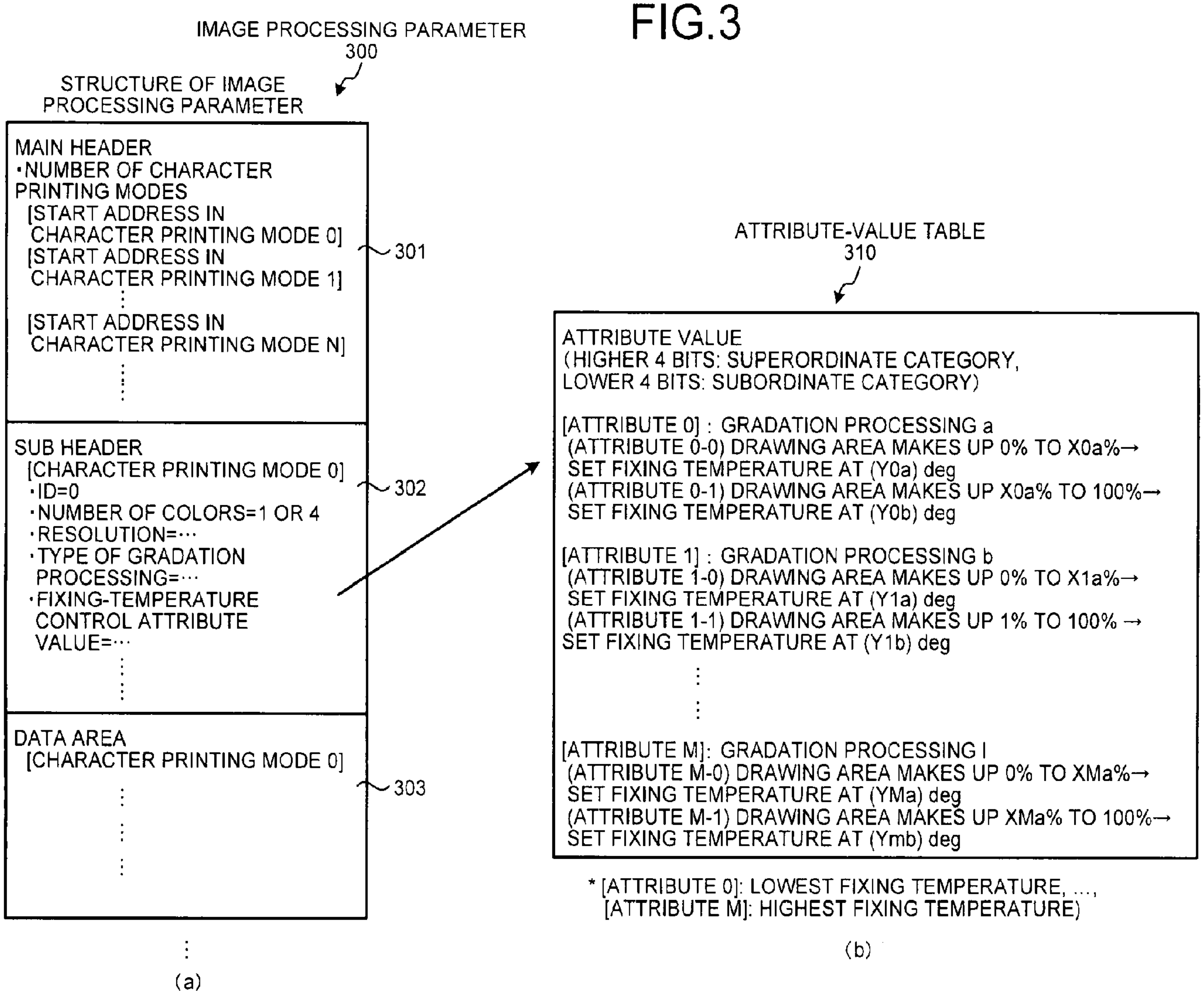
FIG. 3 is a diagram showing a concrete example of the structure of an image processing parameter and an attribute-value table.

FIG. 3 shows a concrete example of the structure of an image processing parameter and an attribute-value table. An image processing parameter 300 is composed of a Main Header part 301, a Sub Header part 302, and a Data Area part 303. In the Main Header part 301, respective start addresses in a plurality of character printing modes are contained. In the Sub Header part 302, information on each character printing mode (the number of colors: black (K) only, or four colors of K, cyan (C), magenta (M), and yellow (Y), etc.; the write resolution; a type of gradation processing: line screen, dispersed-dot, halftone-dot, etc.), an attribute value of fixing-temperature control of the fixing unit 126, and the like are given. In the Data Area part 303, dot arrangement in each character printing mode is contained.

In an attribute-value table 310, a fixing-temperature control attribute value is written in a manner classified into a superordinate category and a subordinate category. In the present embodiment, an attribute value is an 8-bit value; higher 4 bits are assigned to a superordinate category and lower 4 bits are assigned to a subordinate category. It is shown that attributes 0 to M denote superordinate categories, and the fixing control temperature is lowest in the attribute 0 and is highest in the attribute M. There is a plurality of subordinate categories (attributes 0 to N) in each superordinate category, and a drawing area and a fixing temperature value are written in each subordinate category. In the present embodiment, a fixing temperature value in the attribute M falling under the superordinate category is set to the same or similar value as when a fixing temperature value of the fixing unit 126 is not changed. In this attribute-value table 310, a type of gradation processing is further written with respect to each superordinate category, i.e., each of the attributes 0 to M. Namely, a type of gradation processing and a corresponding attribute (superordinate category) of fixing temperature control can be obtained by reference to the attribute-value table 310. Incidentally, in the image processing parameter 300, values of a superordinate category and a subordinate category in each character printing mode are entered in advance.

In the image-formation-attribute-history holding unit 115 to be described later, a usage count (a usage history) of a fixing-temperature control attribute value is held in a manner associated with a superordinate category (any of the attributes 0 to M) and a type of gradation processing corresponding to the fixing-temperature control attribute value; alternatively, the usage count (the usage history) can be held in the attribute-value table 310, in this case, it is not necessary to provide the image-formation-attribute-history holding unit 115.

Figure 4:
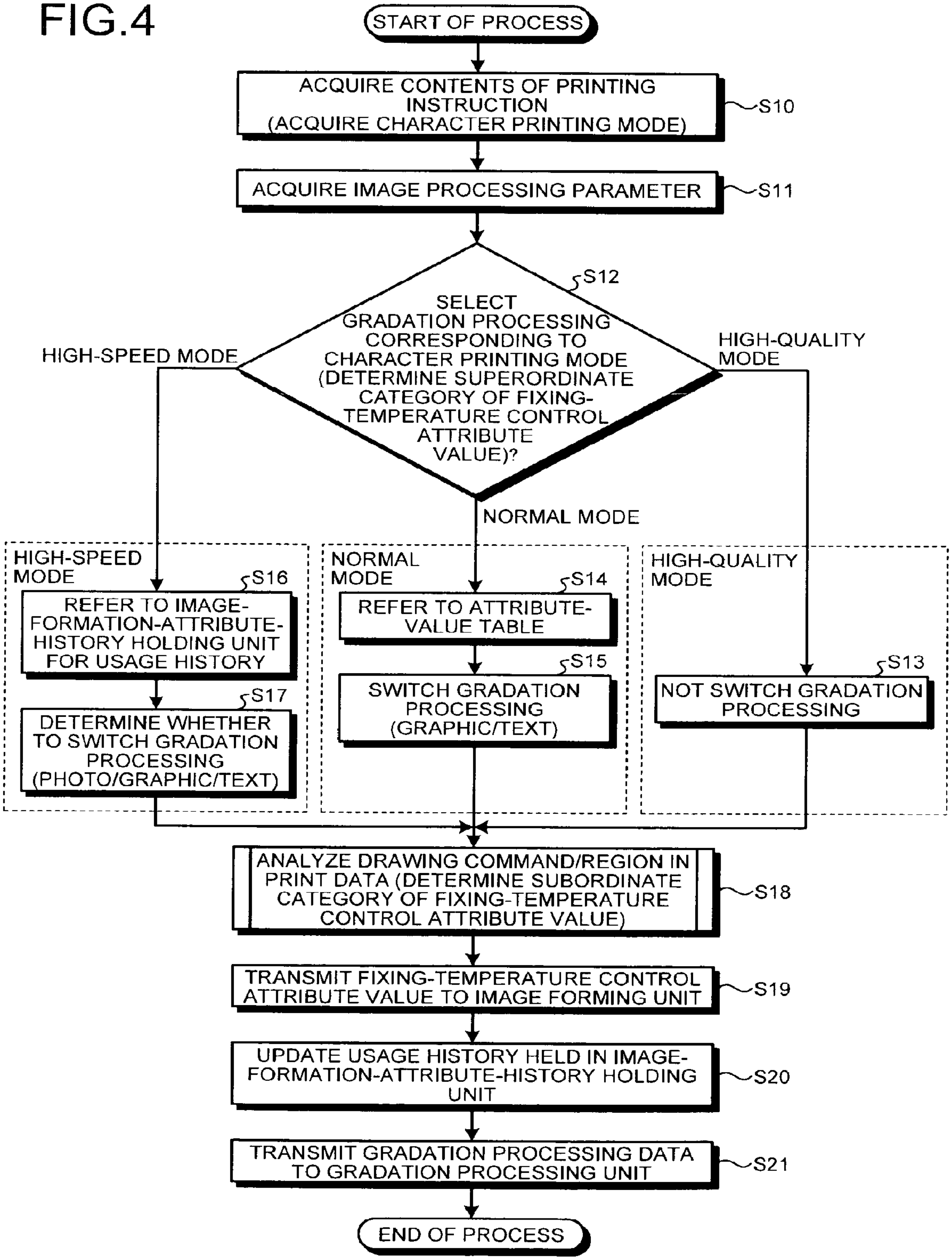
FIG. 4 is a flowchart showing an overall process performed by an image-formation-attribute processing unit in the present image forming apparatus.

Subsequently, a process performed by the image-formation-attribute processing unit 114 is explained in detail. FIG. 4 is a flowchart showing an overall process performed by the image-formation-attribute processing unit 114. As shown in FIG. 4, when the process is started, the image-formation-attribute processing unit 114 first receives print data and printing conditions transmitted from the printer driver 210 of the external device 200, and acquires a printing mode (Step S10). Incidentally, in the present embodiment, as printing modes, a high-speed mode, a normal mode, and a high-quality mode are set. After acquisition of the printing mode, the image-formation-attribute processing unit 114 acquires an image processing parameter corresponding to the printing mode from the image-processing-parameter holding unit 116 (Step S11).

After acquisition of the image processing parameter 300, the image-formation-attribute processing unit 114 selects gradation processing corresponding to the character printing mode (Step S12). In the present embodiment, it is assumed that the character printing mode is set in the printer driver 210 of the external device 200, and at the same time, gradation processing taking into account only the resolving power with respect to each drawing attribute (a photo part, a graphic part, a text part, etc.) is preset. Furthermore, here, any of the normal mode, the high-quality mode, and the high-speed mode is selected as a printing mode.

At Step S12, in a case of the high-quality mode, the image-formation-attribute processing unit 114 selects gradation processing specified by the printer driver 210 and does not change the gradation processing (Step S13). On the other hand, in a case of the normal mode, the image-formation-attribute processing unit 114 does not change gradation processing with respect to a part of the print data of which the drawing attribute is a photo part, but with respect to each of parts of the print data of which the drawing attributes are a graphic part and a text part, the image-formation-attribute processing unit 114 selects gradation processing falling under a superordinate category of a fixing-temperature control attribute value at the next level below that of the preset gradation processing (Step S15) with reference to the attribute-value table 310 (Step S14). For example, when the preset gradation processing is “1”, and a corresponding superordinate category of the fixing-temperature control attribute value is the attribute M, gradation processing in an attribute M-1 is selected. Namely, with respect to a graphic part or a text part, the priority is to lower the fixing temperature to that is at the next level below, and appropriate gradation processing is selected. However, if a superordinate category of a fixing-temperature control attribute value corresponding to the preset gradation processing is the lowest-level attribute (the attribute 0), the gradation processing is not changed.

On the other hand, at Step S12, in a case of the high-speed mode, the image-formation-attribute processing unit 114 temporarily selects gradation processing corresponding to the most often-used superordinate category of a fixing-temperature control attribute value in each drawing attribute (each of the photo part, the graphic part, the text part, and the like) with reference to the image-formation-attribute-history holding unit 115 (Step S16). After the temporary selection, the image-formation-attribute processing unit 114 selects the preset gradation processing if a fixing-temperature control attribute value corresponding to the temporarily-selected gradation processing is larger than a fixing-temperature control attribute value (a superordinate category) corresponding to the preset gradation processing, and selects the temporarily-selected gradation processing if a fixing-temperature control attribute value corresponding to the temporarily-selected gradation processing is smaller than a fixing-temperature control attribute value corresponding to the preset gradation processing (Step S17). Namely, the image-formation-attribute processing unit 114 selects gradation processing requiring a lower fixing temperature.

Through Step S12, gradation processing to be used is determined, and at the same time, a superordinate category corresponding to the gradation processing out of fixing-temperature control attribute values is determined.

Figure 5:
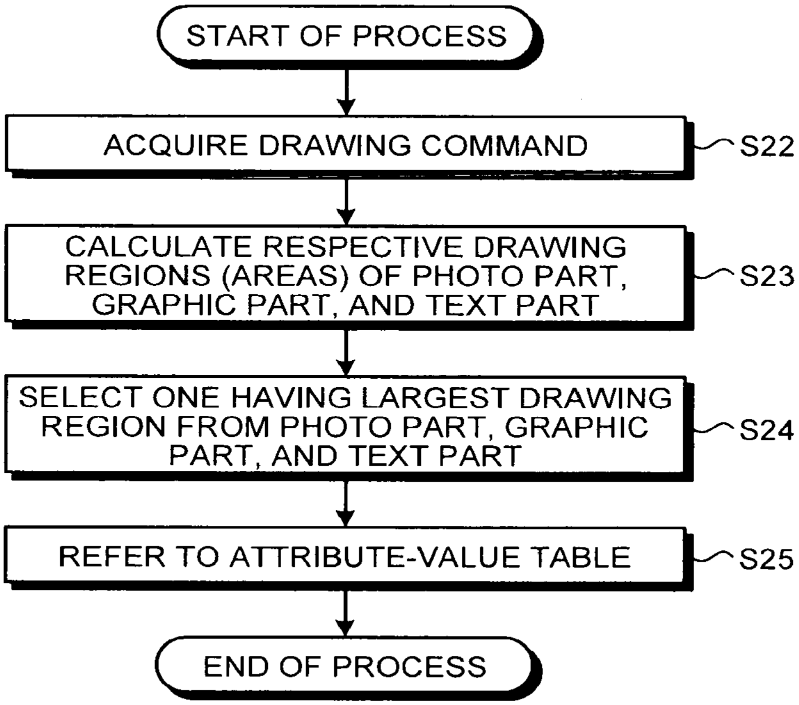
FIG. 5 is a flowchart showing a process at Step S17 in FIG. 4.

Then, the image-formation-attribute processing unit 114 analyzes a drawing command and a drawing region in the print data (Step S18). For details, as shown in a flowchart of FIG. 5, the image-formation-attribute processing unit 114 acquires a drawing command in the print data (Step S22), and calculates respective drawing areas of the photo part, the graphic part, and the text part (Step S23). When the size of a sheet discharged after image formation is A4, a range subject to the calculation of drawing areas is the whole surface of the sheet; however, if one wants to reduce operation in the processing, the sheet except an edge portion can be subject to the calculation of drawing areas. After calculating the drawing areas, the image-formation-attribute processing unit 114 selects a drawing attribute having the largest drawing area in the photo part, the graphic part, and the text part (Step S24), and determines a subordinate category of the fixing-temperature control attribute value with reference to the attribute-value table 310 (Step S25).

Then, the image-formation-attribute processing unit 114 transmits the determined fixing-temperature control attribute value (higher 4 bits: the superordinate category, lower 4 bits: the subordinate category) to the fixing-temperature control unit 122 in the printer control unit 102 (Step S19). After the transmission of the attribute value, on the basis of the previously-determined type of gradation processing, the image-formation-attribute processing unit 114 increments a usage count of the fixing-temperature control attribute value (the superordinate category) held in the image-formation-attribute-history holding unit 115, and updates the usage history (Step S20). Then, after completion of these processes, the image-formation-attribute processing unit 114 transmits gradation processing data to the gradation processing unit 113 (Step S21).

The gradation processing unit 113 performs gradation processing in accordance with the gradation processing data transmitted from the image-formation-attribute processing unit 114; however, gradation processing is performed by switching a type of gradation processing according to a drawing attribute of the print data, so the same gradation processing may be used over the whole image or a plurality of types of gradation processing may be used in the image.

Therefore, according to the embodiment described above, the attribute-value table 310 showing correspondence between a type of gradation processing and a fixing-temperature control attribute value is held in the electrophotographic image forming apparatus 100, and the image forming apparatus 100 determines a type of gradation processing and a corresponding fixing-temperature control attribute value on the basis of contents of a printing instruction and the attribute-value table 310, and performs the determined type of gradation processing, and then controls the fixing temperature in formation of a print image according to the determined fixing-temperature control attribute value; furthermore, the attribute-value table 310 further contains correspondence between a drawing area and a fixing-temperature control attribute value, and the image forming apparatus 100 subdivides the fixing-temperature control attribute value according to a drawing area of the image and controls the fixing temperature, so it is possible to make control of the fixing temperature more efficient and also possible to reduce power consumption.

The embodiment of the present invention is described in detail above; it is obvious that the present invention is not limited to the embodiment described above. Various changes can be made within the scope of claims.

A program executed in the present embodiment is built into the ROM 117 and the ROM 123 in advance, but it is not limited to this. Alternatively, the program executed in the present embodiment can be recorded on a computer-readable recording medium, such as a compact disc-read-only memory (CD-ROM), a flexible disk (FD), a compact disc recordable (CD-R), or a digital versatile disk (DVD), in an installable or executable file format, and the recording medium can be provided as a computer program product.

Furthermore, the program executed in the present embodiment can be stored on a computer connected to a network such as the Internet, and the program can be provided by causing a user to download it via the network. Moreover, the program executed in the present embodiment can be provided or distributed via a network such as the Internet.

The program executed in the present embodiment is composed of a modular configuration made up of the CPU 110 including the above-described color-conversion processing unit 111, density-conversion processing unit 112, gradation processing unit 113, and image-formation-attribute processing unit 114, and a modular configuration made up of the CPU 120 including the fixing-temperature control unit 122; the CPUs 110 and 120 (processors) as actual hardware each read out the program from the above described recording medium and execute the program, thereby loading the program on a main memory, such as the ROM 117 and the ROM 123, and the color-conversion processing unit 111, the density-conversion processing unit 112, the gradation processing unit 113, the image-formation-attribute processing unit 114, and the fixing-temperature control unit 122 are generated on the main memory.

According to the present invention, control of fixing temperature is made more efficient according to a type of gradation processing used in printing, and therefore it is possible to reduce power consumption.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:

an attribute-value-information holding unit that holds an attribute-value table showing correspondence between a type of gradation processing and a fixing-temperature control attribute value;

an image-formation-attribute processing unit that determines a type of gradation processing and a corresponding fixing-temperature control attribute value on the basis of contents of a print instruction and the attribute-value table;

a gradation processing unit that performs gradation processing in accordance with the type of gradation processing determined by the image-formation-attribute processing unit; and a fixing-temperature control unit that controls fixing temperature in formation of a print image according to the fixing-temperature control attribute value determined by the image-formation-attribute processing unit, wherein a target fixing-temperature is controlled on the basis of the type of gradation processing to be used.

2. The image forming apparatus according to claim 1, wherein the image-formation-attribute processing unit selects a type of gradation processing according to a character printing mode and a drawing attribute.

3. The image forming apparatus according to claim 2, wherein in a case of a high-quality mode, the image-formation-attribute processing unit selects a specified type of gradation processing.

4. The image forming apparatus according to claim 2, wherein in a case of a normal mode, the image-formation-attribute processing unit selects a specified type of gradation processing with respect to a part of the image of which the drawing attribute is a photo part, and selects a type of gradation processing corresponding to a fixing-temperature control attribute value at the next level below that of a specified type of gradation processing with respect to parts of the image of which the drawing attributes are a graphic part and a text part.

5. The image forming apparatus according to claim 2, wherein in a case of a high-speed mode, the image-formation-attribute processing unit selects a type of gradation processing with reference to a previously-held usage history of a corresponding fixing-temperature control attribute value.

6. The image forming apparatus according to claim 1, wherein the attribute-value table further contains correspondence between a drawing area and a fixing-temperature control attribute value, and the image-formation-attribute processing unit subdivides a fixing-temperature control attribute value according to a drawing area of the image.

7. The image forming apparatus according to claim 6, wherein the image-formation-attribute processing unit determines a superordinate category of a fixing-temperature control attribute value according to a type of gradation processing, and determines a subordinate category of the fixing-temperature control attribute value according to a drawing area of the image.

8. An image forming method of an image forming apparatus including an attribute-value-information holding unit that holds an attribute-value table showing correspondence between a type of gradation processing and a fixing-temperature control attribute value, the image forming method comprising:

determining a type of gradation processing and a corresponding fixing-temperature control attribute value on the basis of contents of a print instruction and the attribute-value table;

performing gradation processing in accordance with the type of gradation processing determined at the determining; and controlling fixing temperature in formation of a print image according to the fixing-temperature control attribute value determined at the determining, wherein a target fixing-temperature is controlled on the basis of the type of gradation processing to be used.

9. A computer program product comprising a non-transitory computer readable medium having computer readable program instructions that, when executed in a computer including an attribute-value-information holding unit that holds an attribute-value table showing correspondence between a type of gradation processing and a fixing-temperature control attribute value, cause the computer to execute:

determining a type of gradation processing and a corresponding fixing-temperature control attribute value on the basis of contents of a print instruction and the attribute-value table;

performing gradation processing in accordance with the type of gradation processing determined at the determining; and controlling fixing temperature in formation of a print image according to the fixing-temperature control attribute value determined at the determining, wherein a target fixing-temperature is controlled on the basis of the type of gradation processing to be used.

* * * * *